(12) United States Patent
Liu et al.

(10) Patent No.: US 9,560,617 B2
(45) Date of Patent: Jan. 31, 2017

(54) WIRELESS NETWORK ACCESS METHOD AND APPARATUS, TERMINAL, AND SERVER

(71) Applicant: TENCENT TECHNOLOGY (SHENZHEN) COMPANY LIMITED, Shenzhen (CN)

(72) Inventors: Xinqi Liu, Shenzhen (CN); Jian Chen, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 15/215,457

(22) Filed: Jul. 20, 2016

(65) Prior Publication Data
US 2016/0330710 A1 Nov. 10, 2016

Related U.S. Application Data

(63) Continuation of application No. PCT/CN2015/081198, filed on Jun. 10, 2015.

(30) Foreign Application Priority Data

Jun. 11, 2014 (CN) .......................... 2014-1-0258494

(51) Int. Cl.
*H04W 60/00* (2009.01)
*H04L 29/08* (2006.01)
(Continued)

(52) U.S. Cl.
CPC ............ *H04W 60/00* (2013.01); *G06K 7/1417* (2013.01); *H04L 67/02* (2013.01); *H04W 12/06* (2013.01);
(Continued)

(58) Field of Classification Search
CPC ...... H04W 60/00; H04W 12/06; H04W 4/008; H04W 88/02; H04W 84/12; G06K 7/1417; H04L 67/02
See application file for complete search history.

(56) References Cited

U.S. PATENT DOCUMENTS 7,606,560 B2* 10/2009 Labrou ................. G06Q 20/18
455/410
8,732,795 B2* 5/2014 Skeel .................... H04L 9/3271
340/5.83
(Continued)

FOREIGN PATENT DOCUMENTS

CN 102724668 A 10/2012
CN 102932793 A 2/2013
(Continued)

OTHER PUBLICATIONS

The State Intellectual Property Office of the People's Republic of China (SIPO) Office Action 1 for 201410258494.3 Mar. 27, 2015 p. 1-13.
(Continued)

*Primary Examiner* — Nathan Mitchell
(74) *Attorney, Agent, or Firm* — Anova Law Group, PLLC

(57) ABSTRACT

A wireless network access method includes: sending, by a first terminal, a wireless network access request to a server, the wireless network access request carrying identification information of the first terminal and property information of a to-be-accessed wireless network; generating, by the server according to the wireless network access request, an image verification code and returning the image verification code to the first terminal for display; scanning, by a second terminal, the image verification code displayed by the first terminal, generating access authentication information, and sending the information to the server; and performing, by the
(Continued)

server, wireless network access authentication according to the access authentication information, and connecting the first terminal and the second terminal to the wireless network after the authentication succeeds.

18 Claims, 11 Drawing Sheets

(51) Int. Cl.
    *G06K 7/14*         (2006.01)
    *H04W 12/06*      (2009.01)
    *H04W 84/12*      (2009.01)
    *H04W 4/00*       (2009.01)
    *H04W 88/02*      (2009.01)

(52) U.S. Cl.
    CPC ............ *H04W 4/008* (2013.01); *H04W 84/12* (2013.01); *H04W 88/02* (2013.01)

(56) References Cited

U.S. PATENT DOCUMENTS

| | | | | |
|---|---|---|---|---|
| 9,173,115 | B2* | 10/2015 | Sundareswaran | H04L 41/0889 |
| 2008/0247363 | A1* | 10/2008 | Lee | G06F 17/30879 |
| | | | | 370/335 |
| 2010/0075604 | A1* | 3/2010 | Lydon | G06F 21/31 |
| | | | | 455/41.3 |
| 2011/0081860 | A1* | 4/2011 | Brown | H04N 1/00347 |
| | | | | 455/41.3 |
| 2013/0244615 | A1* | 9/2013 | Miller | H04W 12/06 |
| | | | | 455/411 |
| 2013/0305329 | A1* | 11/2013 | Zhang | G06F 21/00 |
| | | | | 726/6 |
| 2013/0337787 | A1* | 12/2013 | Yamada | H04B 10/11 |
| | | | | 455/414.1 |
| 2014/0273820 | A1* | 9/2014 | Narayan | H04W 76/023 |
| | | | | 455/41.1 |
| 2015/0072653 | A1* | 3/2015 | Fan | H04W 12/08 |
| | | | | 455/411 |
| 2015/0124791 | A1* | 5/2015 | Mazandarany | H04W 76/021 |
| | | | | 370/338 |
| 2015/0245281 | A1* | 8/2015 | Beguin | H04W 12/06 |
| | | | | 370/255 |
| 2015/0304847 | A1* | 10/2015 | Gong | H04L 63/0869 |
| | | | | 455/411 |
| 2015/0349917 | A1* | 12/2015 | Skaaksrud | G06Q 10/0833 |
| | | | | 370/328 |
| 2016/0234214 | A1* | 8/2016 | Sethi | H04L 63/06 |
| 2016/0255662 | A1* | 9/2016 | Kotecha | H04W 76/02 |

FOREIGN PATENT DOCUMENTS

| | | |
|---|---|---|
| CN | 103402275 A | 11/2013 |
| CN | 103414881 A | 11/2013 |
| CN | 103686426 A | 3/2014 |
| CN | 104135753 A | 11/2014 |

OTHER PUBLICATIONS

The World Intellectual Property Organization (WIPO) International Search Report for PCT/CN2015/081198 Sep. 18, 2015 p. 1-3.
The State Intellectual Property Office of the People's Republic of China (SIPO) Office Action 2 for 201410258494.3 Jul. 3, 2015 p. 1-5.

* cited by examiner

WIRELESS NETWORK ACCESS METHOD AND APPARATUS, TERMINAL, AND SERVER

CROSS REFERENCE

This application is a continuation application of PCT Patent Application No. PCT/CN2015/081198, filed on Jun. 10, 2015, which claims priority to Chinese Patent Application No. 201410258494.3, entitled "WIRELESS NETWORK ACCESS METHOD AND APPARATUS, TERMINAL, AND SERVER" filed on Jun. 11, 2014, the entire contents of both of which are incorporated herein by reference.

FIELD OF THE TECHNOLOGY

The present disclosure relates to the field of mobile Internet technologies; specifically, to the field of wireless network technologies; and more specifically, to a wireless network access method and apparatus, a terminal, and a server.

BACKGROUND OF THE DISCLOSURE

Development of mobile Internet technologies has resulted in an ever-increasing demand for accessing wireless networks such as Wireless Fidelity (WiFi), Zigbee (a wireless network protocol supporting low-speed and short-distance transmission), and near field communication (NFC). A conventional wireless network access procedure is applicable to access of a single terminal, that is, only one terminal can access the wireless network in one wireless network access procedure. By using WiFi access as an example, a user may enable a wireless access function of a mobile phone, and connect the mobile phone to the WiFi network by searching for a to-be-connected WiFi signal; the user may enable a wireless access function of a PAD (tablet computer), and connect the PAD to the WiFi network by searching for a to-be-connected WiFi signal. However, as terminals are widely used, more and more users have both a mobile phone and a PAD. If the user intends to connect both the mobile phone and the PAD to the wireless network, it is required to separately connect the mobile phone and the PAD to the wireless network according to the conventional wireless network access procedure, which causes complex operations. As can be seen from the above, in the conventional wireless network access solution, a complex access process needs to be performed during access of one or more terminals, which fails to meet the rapid and convenient requirements of the mobile Internet.

SUMMARY

One aspect of the present disclosure provides a wireless network access method. The method includes: sending, by a first terminal, a wireless network access request to a server, the wireless network access request carrying identification information of the first terminal and property information of a to-be-accessed wireless network; generating, by the server according to the wireless network access request, an image verification code and returning the image verification code to the first terminal for display; scanning, by a second terminal, the image verification code displayed by the first terminal, generating access authentication information, and sending the access authentication information to the server; and performing, by the server, wireless network access authentication according to the access authentication information, and connecting the first terminal and the second terminal to the to-be-accessed wireless network after the authentication succeeds.

Another aspect of the present disclosure provides another wireless network access method. The method includes: sending, by a first terminal, a wireless network access request to a server, the wireless network access request carrying identification information of the first terminal and property information of a to-be-accessed wireless network, so that the server returns an image verification code according to the wireless network access request; displaying, by the first terminal, the image verification code, so that a second terminal scans the image verification code to initiate wireless network access authentication to the server, and accesses the to-be-accessed wireless network after the authentication of the server succeeds; and accessing, by the first terminal, the to-be-accessed wireless network after the authentication of the server succeeds.

Still another aspect of the present disclosure provides still another wireless network access method. The method includes: receiving, by a server, a wireless network access request sent by a first terminal, the wireless network access request carrying identification information of the first terminal and property information of a to-be-accessed wireless network; generating, by the server, an image verification code according to the wireless network access request, and returning the image verification code to the first terminal for display, so that a second terminal scans the image verification code to return access authentication information to the server; and performing, by the server, wireless network access authentication according to the access authentication information, and connecting the first terminal and the second terminal to the to-be-accessed wireless network after the authentication succeeds.

Yet another aspect of the present disclosure provides a wireless network access method. The method includes: scanning, by a second terminal, an image verification code displayed by a first terminal, and generating access authentication information, the image verification code including identification information of the first terminal and property information of a to-be-accessed wireless network; sending, by the second terminal, the access authentication information to a server, so that the server performs wireless network access authentication according to the access authentication information, and connects the first terminal to the to-be-accessed wireless network after the authentication succeeds; and accessing, by the second terminal, the to-be-accessed wireless network after the authentication of the server succeeds.

Yet another aspect of the present disclosure provides a wireless network access apparatus. The apparatus includes: a request module, configured to send a wireless network access request to a server, the wireless network access request carrying identification information of a first terminal and property information of a to-be-accessed wireless network, so that the server returns an image verification code according to the wireless network access request; a webpage display module, configured to display the image verification code, so that a second terminal scans the image verification code to initiate wireless network access authentication to the server, and accesses the to-be-accessed wireless network after the authentication of the server succeeds; and an access module, configured to access the to-be-accessed wireless network after the authentication of the server succeeds.

Yet another aspect of the present disclosure provides another wireless network access apparatus, including: a request receiving module, configured to receive a wireless network access request sent by a first terminal, the wireless network access request carrying identification information of the first terminal and property information of a to-be-accessed wireless network; a processing module, configured to generate an image verification code according to the wireless network access request, and return the image verification code to the first terminal for display, so that a second terminal scans the image verification code to return access authentication information to the server; and an access module, configured to perform wireless network access authentication according to the access authentication information, and connect the first terminal and the second terminal to the to-be-accessed wireless network after the authentication succeeds.

Yet another aspect of the present disclosure provides a wireless network access apparatus, including: an information generation module, configured to scan an image verification code displayed by a first terminal, and generate access authentication information, the image verification code including identification information of the first terminal and property information of a to-be-accessed wireless network; an authentication module, configured to send the access authentication information to a server, so that the server performs wireless network access authentication according to the access authentication information, and connects the first terminal to the to-be-accessed wireless network after the authentication succeeds; and an access module, configured to access the to-be-accessed wireless network after the authentication of the server succeeds.

Other aspects of the present disclosure can be understood by those skilled in the art in light of the description, the claims, and the drawings of the present disclosure

BRIEF DESCRIPTION OF THE DRAWINGS

To illustrate the technical solutions according to the embodiments of the present invention or in the prior art more clearly, accompanying drawings required for describing the embodiments or the prior art are introduced briefly below. Apparently, the accompanying drawings in the following description are merely some embodiments of the present invention, and persons of ordinary skill in the art may further obtain other drawings according to the accompanying drawings without creative efforts.

DESCRIPTION OF EMBODIMENTS

The technical solutions in the embodiments of the present invention are clearly and completely described in the following with reference to the accompanying drawings in the embodiments of the present invention. Obviously, the embodiments to be described are part of rather than all of the embodiments of the present invention. All other embodiments obtained by persons skilled in the art based on the embodiments of the present invention without creative efforts shall fall within the protection scope of the present disclosure.

A wireless network access method provided by the embodiments of the present invention is described in detail below with reference to FIG. 1 to FIG. 6.

Figure 1:
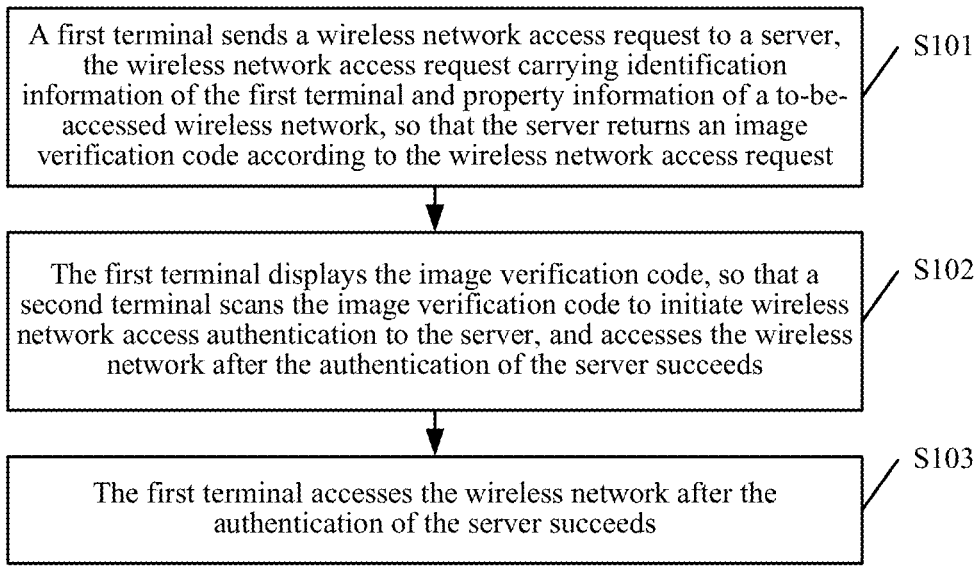
FIG. 1 illustrates a flowchart of a wireless network access method according to an embodiment of the present invention.

Refer to FIG. 1, which is a flowchart of a wireless network access method according to an embodiment of the present invention. This embodiment describes a specific process of the wireless network access method from the perspective of a first terminal, and the method may include the following steps S101 to S103.

S101. A first terminal sends a wireless network access request to a server, the wireless network access request carrying identification information of the first terminal and property information of a to-be-accessed wireless network, so that the server returns an image verification code according to the wireless network access request.

The first terminal may be a terminal device with a wireless network access function, which includes, but is not limited to, a notebook computer, a mobile phone, a PAD, a smart wearable device, and the like. The identification information of the first terminal is used to uniquely identify the first terminal, which may be an Internet Protocol (IP) address of the first terminal or a factory serial number of the first terminal. The property information of the wireless network includes a name and/or an address of the wireless network. The property information of the wireless network may uniquely identify the wireless network, and shall be necessary information for accessing the wireless network. It should be noted that, according to a wireless network access feature, the property information of the wireless network may further include information about whether to set a key, information about a provider of the wireless network, signal strength of the wireless network, and the like. For example, property information of a WiFi network may include a WiFi name and a WiFi IP address, and may further include information about a WiFi network provider, information about whether to set a key, and the like. The image verification code may be a two-dimensional code, which includes, but is not limited to, a Quick Response (QR) code, a Portable Document Format 417 (PDF417) two-dimensional code, a Datamatrix (a matrix-type two-dimensional code) two-dimensional code, and the like.

During specific implementation, the server generates the image verification code according to the wireless network access request from the first terminal, where the image verification code includes the identification information of the first terminal and the property information of the wireless network; and further, the server returns the image verification code to the first terminal.

S102. The first terminal displays the image verification code, so that a second terminal scans the image verification code to initiate wireless network access authentication to the server, and accesses the wireless network after the authentication of the server succeeds.

The second terminal may be a terminal device with a code scanning function, which includes, but is not limited to, a notebook computer, a mobile phone, a PAD, a smart wearable device, and the like. During actual application, an application with a code scanning function may be installed in the second terminal, such as an instant messaging application, a social networking service (SNS) application, or a browser application; and the second terminal may enable the application with the code scanning function, and scan and parse the image verification code displayed by the first terminal. Because the image verification code includes the identification information of the first terminal and the property information of the wireless network, the second terminal initiates wireless network access authentication based on a scanning result of the image verification code; the server may acquire an authentication result by authenticating whether the identification information of the first terminal and the property information of the wireless network that are submitted by the second terminal are correct, and connect the second terminal to the wireless network after the authentication succeeds.

S103. The first terminal accesses the wireless network after the authentication of the server succeeds.

After the authentication succeeds, the server may connect the first terminal to the wireless network according to the identification information of the first terminal, so that the first terminal and the second terminal are connected to the wireless network at the same time in one wireless network access procedure, thereby simplifying a wireless network access process.

In this embodiment of the present invention, a first terminal displays an image verification code, and a second terminal initiates a wireless network access process by scanning the image verification code, so that one or more terminals can fast and conveniently access a wireless network by collaborative operations of the first terminal and the second terminal, thereby improving wireless network access efficiency; in addition, the wireless network is accessed in a code scanning manner, without the need of manually entering information and performing search, thereby further improving the wireless network access efficiency and satisfying the fast and convenient requirements of the mobile Internet.

In some embodiments, after the server authenticates the second terminal and granted internet access to the second terminal through the to-be-accessed wireless network (e.g., using a password, a SMS verification code, or steps S101-S103), a third terminal may act as the first terminal in steps S101-S103 to gain access to the wireless network. In other words, the third terminal may display a second image verification code returned by the server, the second image verification code including the identification information of the third terminal and the property information of the to-be-accessed wireless network. The second terminal may scan the second image verification code, generate the access authentication information according to the identification information of the third terminal, the property information of the to-be-accessed wireless network, and the identification information of the second terminal. The server may receive the access authentication information from the second terminal, authenticate the third terminal accordingly, and grant access for the third terminal to the to-be-accessed wireless network when the authentication succeeds.

Figure 2:
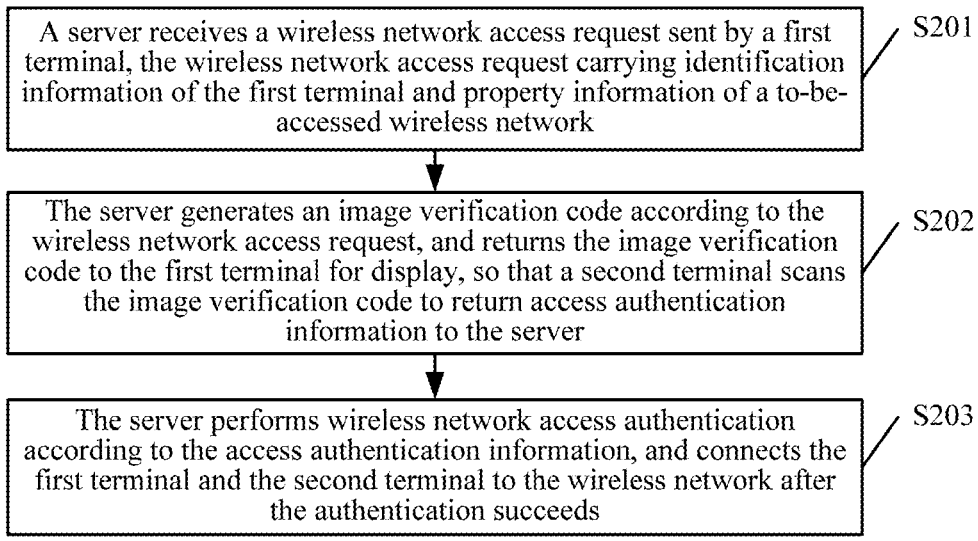
FIG. 2 illustrates a flowchart of another wireless network access method according to an embodiment of the present invention.

Refer to FIG. 2, which is a flowchart of another wireless network access method according to an embodiment of the present invention. This embodiment describes a specific process of the wireless network access method from the perspective of a server, and the method may include the following steps S201 to S203.

S201. A server receives a wireless network access request sent by a first terminal, the wireless network access request carrying identification information of the first terminal and property information of a to-be-accessed wireless network.

The first terminal may be a terminal device with a wireless network access function, which includes, but is not limited to, a notebook computer, a mobile phone, a PAD, a smart wearable device, and the like. The identification information of the first terminal is used to uniquely identify the first terminal, which may be an IP address of the first terminal or a factory serial number of the first terminal. The property information of the wireless network includes a name and/or an address of the wireless network. The property information of the wireless network may uniquely identify the wireless network, and shall be necessary information for accessing the wireless network. It should be noted that, according to a wireless network access feature, the property information of the wireless network may further include information about whether to set a key, information about a provider of the wireless network, signal strength of the wireless network, and the like. For example, property information of a WiFi network may include a WiFi name and a WiFi IP address, and may further include information about a WiFi network provider, information about whether to set a key, and the like.

S202. The server generates an image verification code according to the wireless network access request, and returns the image verification code to the first terminal for display, so that a second terminal scans the image verification code to return access authentication information to the server.

The image verification code may be a two-dimensional code, which includes, but is not limited to, a QR code, a PDF417 two-dimensional code, a Datamatrix two-dimensional code, and the like. The image verification code includes the identification information of the first terminal and the property information of the wireless network. The second terminal may be a terminal device with a code scanning function, which includes, but is not limited to, a notebook computer, a mobile phone, a PAD, a smart wearable device, and the like. During actual application, an application with a code scanning function may be installed in the second terminal, such as an instant messaging application, an SNS application, or a browser application; and the second terminal may enable the application with the code scanning function, and scan and parse the image verification code displayed by the first terminal, to obtain the identification information of the first terminal and the property information of the wireless network; and the second terminal generates the access authentication information according to the identification information of the first terminal and the property information of the wireless network that are obtained by code scanning, and identification information of the second terminal.

S203. The server performs wireless network access authentication according to the access authentication information, and connects the first terminal and the second terminal to the wireless network after the authentication succeeds.

The server authenticates whether the identification information of the first terminal and the property information of the wireless network in the access authentication information are correct; it indicates that the authentication succeeds if they are correct; and it indicates that the authentication fails if they are incorrect. After the authentication succeeds, the server may connect the first terminal to the wireless network according to the identification information of the first terminal; and the server may further connect the second terminal to the wireless network according to the identification information of the second terminal, so that the first terminal and the second terminal are connected to the wireless network at the same time in one wireless network access procedure, thereby simplifying a wireless network access process.

In this embodiment of the present invention, a first terminal displays an image verification code, and a second terminal initiates a wireless network access process by scanning the image verification code, so that one or more terminals can fast and conveniently access a wireless network by collaborative operations of the first terminal and the second terminal, thereby improving wireless network access efficiency; in addition, the wireless network is accessed in a code scanning manner, without the need of manually entering information and performing search, thereby further improving the wireless network access efficiency and satisfying the fast and convenient requirements of the mobile Internet.

Figure 3:
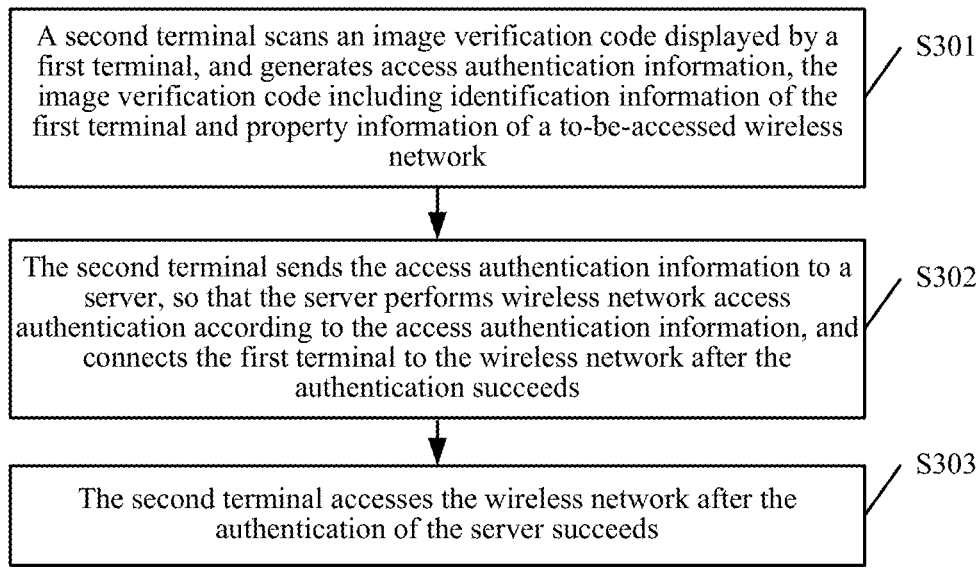
FIG. 3 illustrates a flowchart of still another wireless network access method according to an embodiment of the present invention.

Refer to FIG. 3, which is a flowchart of still another wireless network access method according to an embodiment of the present invention. This embodiment describes a specific process of the wireless network access method from the perspective of a second terminal, and the method may include the following steps S301 to S303.

S301. A second terminal scans an image verification code displayed by a first terminal, and generates access authentication information, the image verification code including identification information of the first terminal and property information of a to-be-accessed wireless network.

The second terminal may be a terminal device with a code scanning function, which includes, but is not limited to, a notebook computer, a mobile phone, a PAD, a smart wearable device, and the like. During actual application, an application with a code scanning function may be installed in the second terminal, such as an instant messaging application, an SNS application, or a browser application; and the second terminal may enable the application with the code scanning function, and scan and parse the image verification code displayed by the first terminal, to obtain the identification information of the first terminal and the property information of the wireless network; and the second terminal generates the access authentication information according to the identification information of the first terminal and the property information of the wireless network that are obtained by code scanning, and identification information of the second terminal.

S302. The second terminal sends the access authentication information to a server, so that the server performs wireless network access authentication according to the access authentication information, and connects the first terminal to the wireless network after the authentication succeeds.

The server authenticates whether the identification information of the first terminal and the property information of the wireless network in the access authentication information are correct; it indicates that the authentication succeeds if they are correct; and it indicates that the authentication fails if they are incorrect. After the authentication succeeds, the server may connect the first terminal to the wireless network according to the identification information of the first terminal.

S303. The second terminal accesses the wireless network after the authentication of the server succeeds.

After the authentication succeeds, the server may connect the second terminal to the wireless network according to the identification information of the second terminal, so that the first terminal and the second terminal are connected to the wireless network at the same time in one wireless network access procedure, thereby simplifying a wireless network access process.

In this embodiment of the present invention, a first terminal displays an image verification code, and a second terminal initiates a wireless network access process by scanning the image verification code, so that one or more terminals can fast and conveniently access a wireless network by collaborative operations of the first terminal and the second terminal, thereby improving wireless network access efficiency; in addition, the wireless network is accessed in a code scanning manner, without the need of manually entering information and performing search, thereby further improving the wireless network access efficiency and satisfying the fast and convenient requirements of the mobile Internet.

Figure 4:
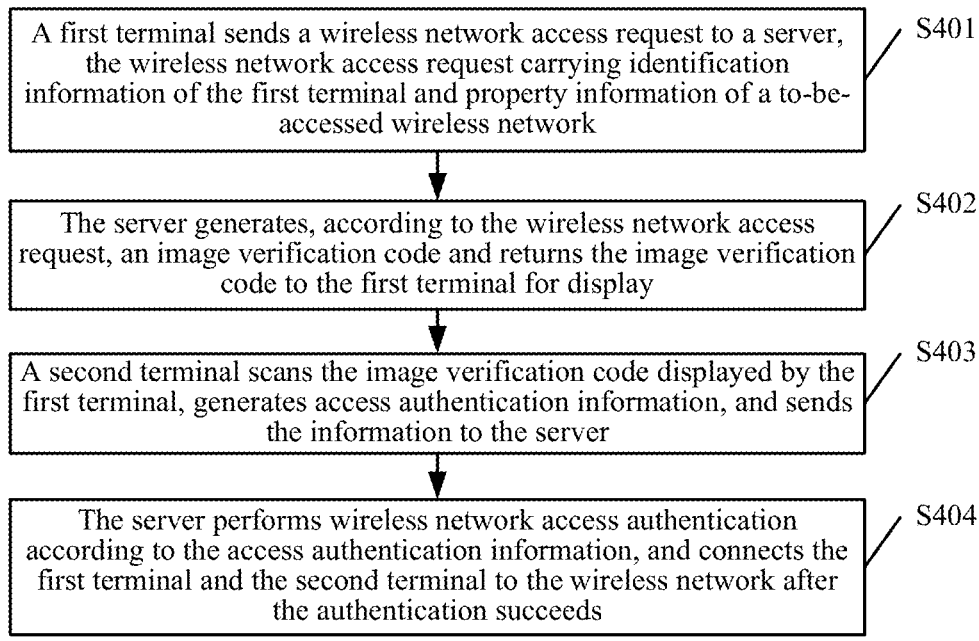
FIG. 4 illustrates a flowchart of yet another wireless network access method according to an embodiment of the present invention.

Refer to FIG. 4, which is a flowchart of yet another wireless network access method according to an embodiment of the present invention. This embodiment describes a specific process of the wireless network access method from the perspective of interaction between a first terminal, a second terminal, and a server; and the method may include the following steps S401 to S403.

S401. A first terminal sends a wireless network access request to a server, the wireless network access request carrying identification information of the first terminal and property information of a to-be-accessed wireless network.

The first terminal may be a terminal device with a wireless network access function, which includes, but is not limited to, a notebook computer, a mobile phone, a PAD, a smart wearable device, and the like. The identification information of the first terminal is used to uniquely identify the first terminal, which may be an IP address of the first terminal or a factory serial number of the first terminal. The property information of the wireless network includes a name and/or an address of the wireless network. The property information of the wireless network may uniquely identify the wireless network, and shall be necessary information for accessing the wireless network. It should be noted that, according to a wireless network access feature, the property information of the wireless network may further include information about whether to set a key, information about a provider of the wireless network, signal strength of the wireless network, and the like. For example, property information of a WiFi network may include a WiFi name and a WiFi IP address, and may further include information about a WiFi network provider, information about whether to set a key, and the like.

S402. The server generates, according to the wireless network access request, an image verification code and returns the image verification code to the first terminal for display.

The image verification code may be a two-dimensional code, which includes, but is not limited to, a QR code, a PDF417 two-dimensional code, a Datamatrix two-dimensional code, and the like. During specific implementation, the server generates the image verification code according to the wireless network access request from the first terminal, where the image verification code includes the identification information of the first terminal and the property information of the wireless network; and further, the server returns the image verification code to the first terminal for display.

S403. A second terminal scans the image verification code displayed by the first terminal, generates access authentication information, and sends the access authentication information to the server.

The second terminal may be a terminal device with a code scanning function, which includes, but is not limited to, a notebook computer, a mobile phone, a PAD, a smart wearable device, and the like. During actual application, an application with a code scanning function may be installed in the second terminal, such as an instant messaging application, an SNS application, or a browser application; and the second terminal may enable the application with the code scanning function, and scan and parse the image verification code displayed by the first terminal, to obtain the identification information of the first terminal and the property information of the wireless network; and the second terminal generates the access authentication information according to the identification information of the first terminal and the property information of the wireless network that are obtained by code scanning, and identification information of the second terminal.

S404. The server performs wireless network access authentication according to the access authentication information, and connects the first terminal and the second terminal to the wireless network after the authentication succeeds.

The server authenticates whether the identification information of the first terminal and the property information of the wireless network in the access authentication information are correct; it indicates that the authentication succeeds if they are correct; and it indicates that the authentication fails if they are incorrect. After the authentication succeeds, the server may connect the first terminal to the wireless network according to the identification information of the first terminal. In addition, the server may further connect the second terminal to the wireless network according to the identification information of the second terminal, so that the first terminal and the second terminal are connected to the wireless network at the same time in one wireless network access procedure, thereby simplifying a wireless network access process.

In this embodiment of the present invention, a first terminal displays an image verification code, and a second terminal initiates a wireless network access process by scanning the image verification code, so that one or more terminals can fast and conveniently access a wireless network by collaborative operations of the first terminal and the second terminal, thereby improving wireless network access efficiency; in addition, the wireless network is accessed in a code scanning manner, without the need of manually entering information and performing search, thereby further improving the wireless network access efficiency and satisfying the fast and convenient requirements of the mobile Internet.

Figure 5:
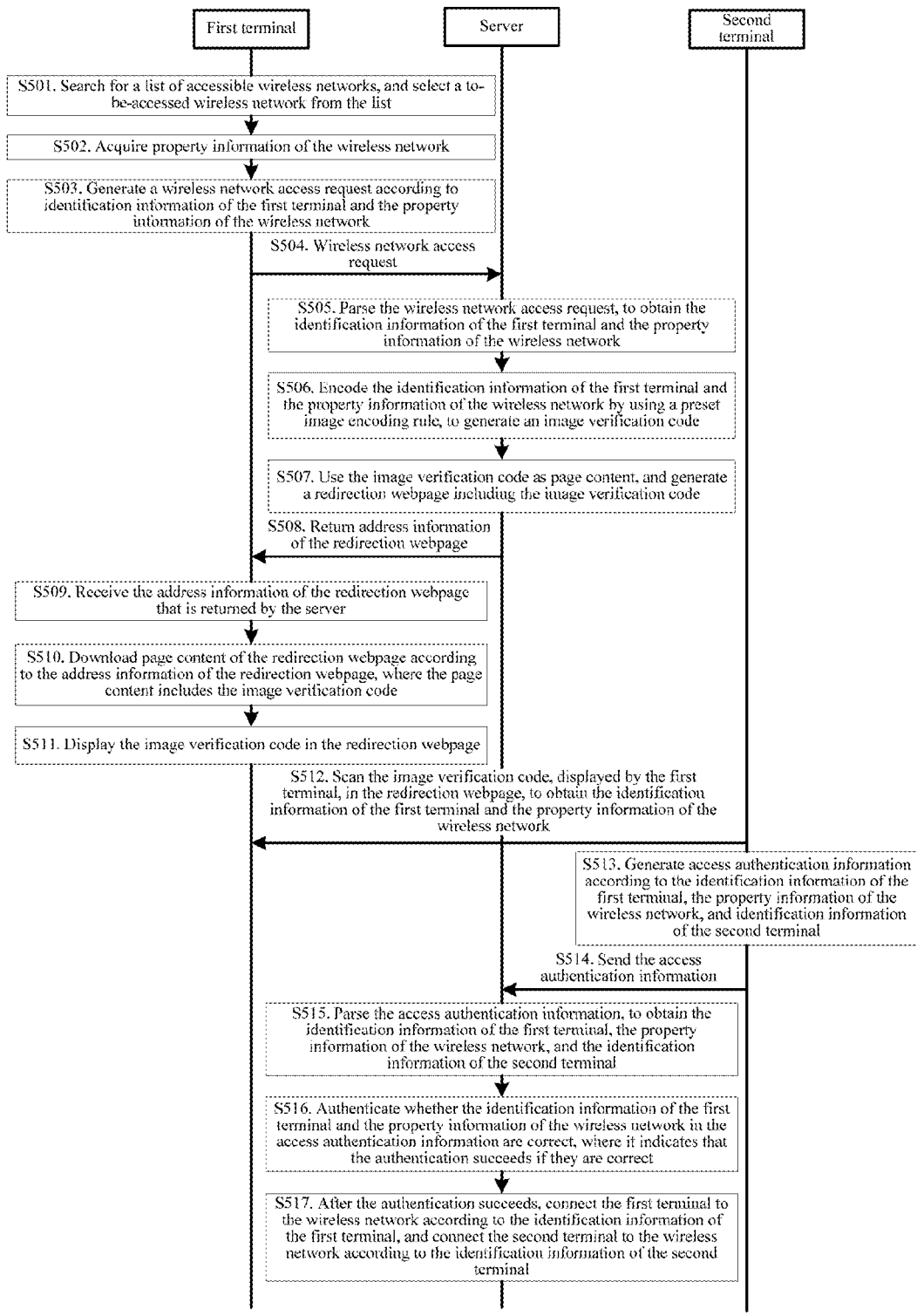
FIG. 5 illustrates a flowchart of still yet another wireless network access method according to an embodiment of the present invention.

Refer to FIG. 5, which is a flowchart of still yet another wireless network access method according to an embodiment of the present invention. This embodiment describes a specific process of the wireless network access method from the perspective of interaction between a first terminal, a second terminal, and a server; and the method may include the following steps S501 to S517. In some embodiments, the server may further include a wireless access device (e.g., a router, an access point) and an authentication device. The wireless access device may provide wireless access in a local area within its signal range. The first terminal and the second terminal may be both included in the range of the wireless access device. The wireless access device may connect to the authentication device via a local connection or via the Internet. In one embodiment, the authentication device may be configured to authenticate connected terminals for multiple wireless networks through a plurality of wireless access devices.

S501. The first terminal searches for a list of accessible wireless networks, and selects a to-be-accessed wireless network from the list of wireless networks. For example, the to-be-accessed wireless network is maintained by the wireless access device.

The first terminal may be a terminal device with a wireless network access function, which includes, but is not limited to, a notebook computer, a mobile phone, a PAD, a smart wearable device, and the like. In this step, the first terminal may enable a wireless network access function thereof, searches for a list of accessible wireless networks, and selects a to-be-accessed wireless network. For example, when a user is in a coffee shop, a list of accessible wireless networks that can be searched for by a handheld PAD includes a total of three wireless networks: A, B, and C, the user intends to access the wireless network A, and then the user can select the wireless network A from the list of wireless networks by using the PAD.

S502. The first terminal acquires property information of the wireless network.

The property information of the wireless network may uniquely identify the wireless network, and shall be necessary information for accessing the wireless network. It should be noted that, according to a wireless network access feature, the property information of the wireless network may further include information about whether to set a key, information about a provider of the wireless network, signal strength of the wireless network, and the like. Based on the example in step S501, after selecting the wireless network A, the PAD acquires property information of the wireless network A, which may include: a name "cafe" of the wireless network A and an IP address "192.16.0.111" of the wireless network A.

S503. The first terminal generates a wireless network access request according to identification information of the first terminal and the property information of the wireless network. For example, the identification information of the first terminal may be a MAC address of the first terminal or an IP address of the first terminal assigned by the wireless access device.

S504. The first terminal sends the wireless network access request to the server. For example, the wireless access device may receive the wireless network access request and send the wireless network access request to the authentication device.

Steps S501 to S504 in this embodiment may be specific detailed steps of step S401 in the embodiment shown in FIG. 4.

S505. The server parses the wireless network access request, to obtain the identification information of the first terminal and the property information of the wireless network. For example, the authentication device may parse the wireless network access request and store the parsed wireless network access request.

S506. The server encodes the identification information of the first terminal and the property information of the wireless network by using a preset image encoding rule, to generate an image verification code. For example, the authentication device may generate the image verification code.

The preset image encoding rule may be a two-dimensional code encoding rule; and the image verification code may be a two-dimensional code, which includes, but is not limited to, a QR code, a PDF417 two-dimensional code, a Datamatrix two-dimensional code, and the like.

S507. The server uses the image verification code as page content, and generates a redirection webpage including the image verification code. In other words, the server generates a redirection webpage, the page content of the redirection webpage including the image verification code.

For example, the redirection webpage may be accessible for the wireless access device via the Internet at a URL address or hosted by the wireless access device at a designated local IP address. In some embodiments, the authentication device may store various redirection webpage templates for different wireless networks. The authentication device may insert the generated image verification code to the redirection webpage template corresponding to the wireless network identified through the parsed wireless network access request, so that the redirection webpage specifically for the first terminal and the to-be-accessed wireless network can be generated.

It should be noted that, the redirection webpage may further include other content in addition to this page content, that is, the image verification code, for example, may further include pictures and text related to the provider of the wireless network, or some advertisement content.

S508. The server returns address information of the redirection webpage to the first terminal. The address information of the redirection webpage may be uniform resource locator (URL) information. For example, the wireless access device may redirect the first terminal to the generated redirection webpage.

S509. The first terminal receives the address information of the redirection webpage that is returned by the server.

S510. The first terminal downloads page content of the redirection webpage according to the address information of the redirection webpage, where the page content includes the image verification code.

S511. The first terminal displays the image verification code in the redirection webpage.

The first terminal may include a browser, and the first terminal may display the redirection webpage by using the browser. It should be noted that, the redirection webpage is characterized by that, after the browser of the first terminal is started, no matter which address information is entered to an address bar of the browser, the browser of the first terminal is always redirected to address information of the redirection webpage, thereby displaying the image verification code in the redirection webpage.

Steps S505 to S511 in this embodiment may be specific detailed steps of step S402 in the embodiment shown in FIG. 4.

S512. The second terminal scans the image verification code, displayed by the first terminal, in the redirection webpage, to obtain the identification information of the first terminal and the property information of the wireless network.

The second terminal may be a terminal device with a code scanning function, which includes, but is not limited to, a notebook computer, a mobile phone, a PAD, a smart wearable device, and the like. During actual application, an application with a code scanning function may be installed in the second terminal, such as an instant messaging application, an SNS application, or a browser application; and the second terminal may enable the application with the code scanning function, and scan and parse the image verification code, displayed by the first terminal, in the redirection webpage, to obtain the identification information of the first terminal and the property information of the wireless network.

S513. The second terminal generates access authentication information according to the identification information of the first terminal, the property information of the wireless network, and identification information of the second terminal. For example, the application with the code scanning function installed in the second terminal may include a specific function for WiFi authentication scan. The user may select the function in Step S512 and activate a scanning interface to perform the code scanning. The application in the second terminal may automatically obtain the identification information of the first terminal and the property information of the wireless network according to the scanned code, and generate the access authentication information accordingly. In some embodiments, the identification information of the second terminal may include a user account information associated with the application in the second terminal (e.g., user ID for logging to the application).

S514. The second terminal sends the access authentication information to the server. For example, after generating the access authentication information, the application in the second terminal may automatically send the access authentication information to the authentication device. In one embodiment, the second terminal may be connected to a communication network other than the to-be-accessed wireless network (e.g., a cellular data connection) and may send the access authentication information to the authentication device via the Internet. In another embodiment, the second terminal may connect to the to-be-accessed wireless network (e.g., by selecting the wireless network from the list of accessible wireless networks) and send the access authentication information through the to-be-accessed wireless network.

Steps S512 to S514 in this embodiment may be specific detailed steps of step S403 in the embodiment shown in FIG. 4.

S515. The server parses the access authentication information, to obtain the identification information of the first terminal, the property information of the wireless network, and the identification information of the second terminal. For example, the authentication device may parse the access authentication information.

S516. The server authenticates whether the identification information of the first terminal and the property information of the wireless network in the access authentication information are correct, where it indicates that the authentication succeeds if they are correct. For example, the authentication device may parse the access authentication information, match the identification information of the first terminal and the property information of the wireless network in the access authentication information with information in stored wireless network access requests, and determines that the authentication succeeds when a match is found. When the authentication device cannot find a match or cannot parse the access authentication information, it determines that the authentication fails. In some embodiments, the authentication device may determine the authentication succeeds when the identification information of the first terminal and the property information of the wireless network are correct and the identification information of the second terminal are found in a preset list.

S517. After the authentication succeeds, the server connects the first terminal to the wireless network according to the identification information of the first terminal, and connects the second terminal to the wireless network according to the identification information of the second terminal. For example, after the authentication succeeds, the authentication device informs the wireless access device to grant internet access to the first terminal and the second terminal. Further, the authentication device may inform the application in the second terminal to automatically disconnect the second terminal with the current communication network (if not already connected to the wireless access network) and connect the second terminal to the wireless network maintained by the wireless access device according to the property information of the wireless network.

Steps S515 to S517 in this embodiment may be specific detailed steps of step S404 in the embodiment shown in FIG. 4.

In this embodiment of the present invention, a first terminal displays an image verification code, and a second terminal initiates a wireless network access process by scanning the image verification code, so that one or more terminals can fast and conveniently access a wireless network by collaborative operations of the first terminal and the second terminal, thereby improving wireless network access efficiency; in addition, the wireless network is accessed in a code scanning manner, without the need of manually entering information and performing search, thereby further improving the wireless network access efficiency and satisfying the fast and convenient requirements of the mobile Internet.

With reference to FIG. 6, a specific flow of a wireless network access method provided by the embodiments of the present invention is described in detail below.

Figure 6A:
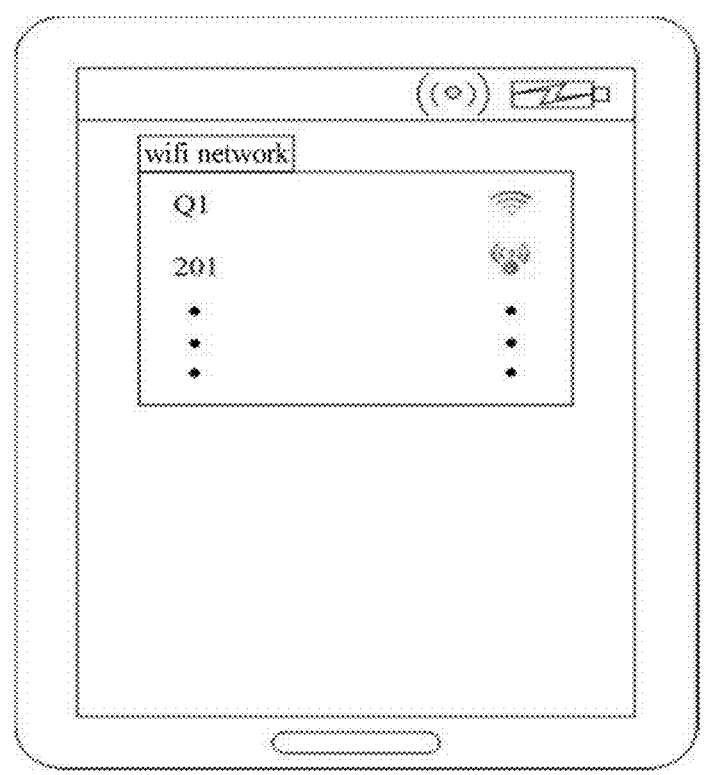
FIG. 6a illustrates a schematic diagram of a wireless network access method according to an embodiment of the present invention.

It is assumed that the first terminal is a PAD and identification information thereof is M, and the second terminal is a mobile phone, and identification information thereof is N. A user having both the PAD and the mobile phone is currently in a coffee shop, and intends to access the WiFi network provided by the coffee shop, where property information of the WiFi network includes: a name "Q1" of the WiFi network and an IP address "192.168.1.23" of the WiFi network. A process of the wireless network access method provided by this embodiment of the present invention is as follows:

Refer to FIG. 6a, which is a schematic diagram of a wireless network access method according to an embodiment of the present invention. The user enables a wireless network access function of the PAD, and the PAD searches for a list of accessible WiFi networks. As shown in FIG. 6a, the WiFi list includes multiple WiFi networks. The user selects a WiFi network of which the name is "Q1" from the WiFi list by using the PAD, and the PAD acquires the property information of the selected WiFi network, which includes the name "Q1" of the WiFi network and an IP address "192.168.1.23" of the WiFi network. The PAD generates a wireless network access request according to identification information M of the PAD, the name "Q1" of the WiFi network, and the IP address "192.168.1.23" of the WiFi network, and sends the wireless network access request to a server.

The server parses the wireless network access request, to obtain the identification information M of the PAD, the name "Q1" of the WiFi network, and the IP address "192.168.1.23" of the WiFi network. Further, the server performs two-dimensional code encoding processing on the information obtained after parsing, to generate a two-dimensional code; and uses the two-dimensional code and an advertising picture of the coffee shop as webpage content, to generate a redirection webpage; and then returns address information of the redirection webpage to the PAD.

Figure 6B:
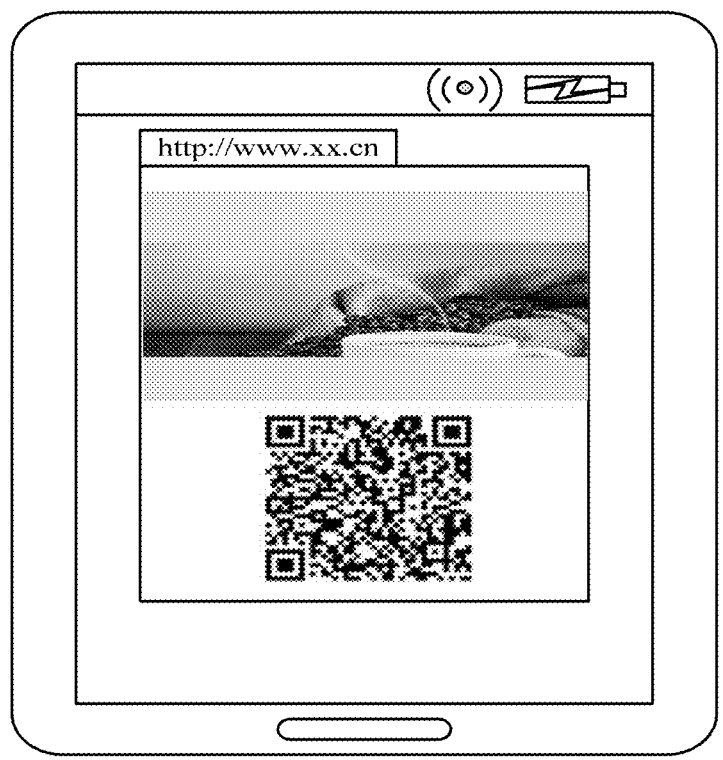
FIG. 6b illustrates another schematic diagram of a wireless network access method according to an embodiment of the present invention.

Refer to FIG. 6b, which is another schematic diagram of a wireless network access method according to an embodiment of the present invention. The PAD opens a browser, downloads page content of the redirection webpage according to the address information of the redirection webpage that is returned by the server, and displays the page content by using the browser, where a display effect may be shown in FIG. 6b. It should be noted that, in this embodiment of the present invention, prompt information may be output in this step, to prompt the user to scan the two-dimensional code with the mobile phone to access the WiFi network.

Figure 6C:
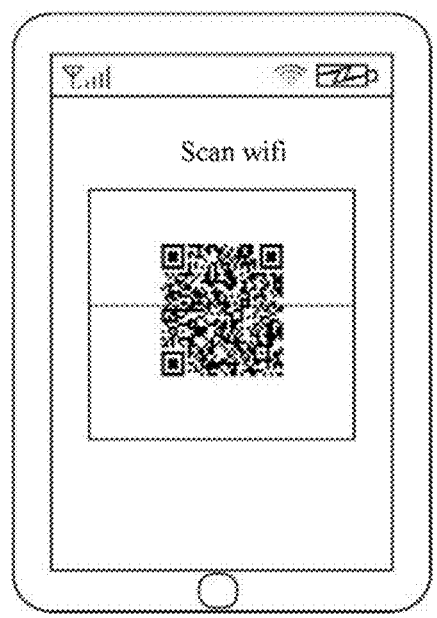
FIG. 6c illustrates still another schematic diagram of a wireless network access method according to an embodiment of the present invention.

Refer to FIG. 6c, which is still another schematic diagram of a wireless network access method according to an embodiment of the present invention. The user enables a code scanning function of an instant messaging application in the mobile phone, scans the two-dimensional code, displayed by the PAD, in the redirection webpage, and acquires the identification information M of the PAD, the name "Q1" of the WiFi network, and the IP address "192.168.1.23" of the WiFi network. The mobile phone generates access authentication information according to the identification information M of the PAD, the name "Q1" of the WiFi network, the IP address "192.168.1.23" of the WiFi network, and identification information N of the mobile phone, and sends the access authentication information to the server for authentication.

The server parses the access authentication information, and acquires the identification information M of the PAD, the name "Q1" of the WiFi network, the IP address "192.168.1.23" of the WiFi network, and the identification information N of the mobile phone. Further, the server authenticates whether the identification information M of the PAD, the name "Q1" of the WiFi network, and the IP address "192.168.1.23" of the WiFi network in the access authentication information are correct, where it indicates that the authentication succeeds if they are correct. After the authentication succeeds, the server connects the PAD to the WiFi network according to the identification information M of the PAD, and connects the mobile phone to the WiFi network according to the identification information N of the mobile phone.

Figure 6D:
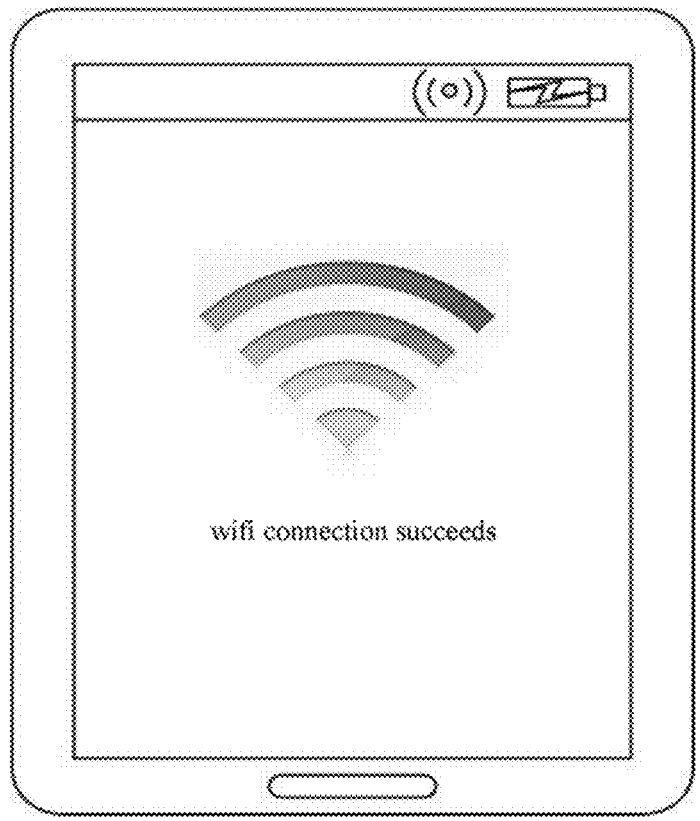
FIG. 6d illustrates yet another schematic diagram of a wireless network access method according to an embodiment of the present invention.
Figure 6E:
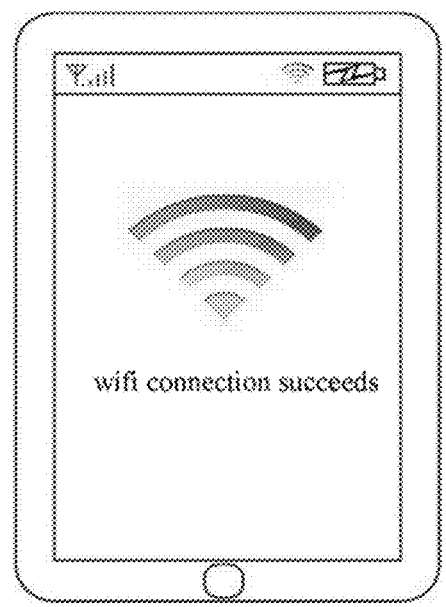
FIG. 6e illustrates still yet another schematic diagram of a wireless network access method according to an embodiment of the present invention.

Refer to FIG. 6d, which is yet another schematic diagram of a wireless network access method according to an embodiment of the present invention. In this embodiment of the present invention, after successfully accessing the WiFi network, the PAD may output prompt information shown in FIG. 6d, to prompt a WiFi connection success. Further, refer to FIG. 6e, which is still yet another schematic diagram of a wireless network access method according to an embodiment of the present invention. In this embodiment of the present invention, after successfully accessing the WiFi network, the mobile phone may output prompt information shown in FIG. 6e, to prompt a WiFi connection success. In this way, the PAD and the mobile phone are connected to a same WiFi network at the same time in one wireless network access procedure, thereby simplifying a wireless network access process.

In this embodiment of the present invention, a first terminal displays an image verification code, and a second terminal initiates a wireless network access process by scanning the image verification code, so that one or more terminals can fast and conveniently access a wireless network by collaborative operations of the first terminal and the second terminal, thereby improving wireless network access efficiency; in addition, the wireless network is accessed in a code scanning manner, without the need of manually entering information and performing search, thereby further improving the wireless network access efficiency and satisfying the fast and convenient requirements of the mobile Internet.

A wireless network access apparatus provided by the embodiments of the present invention is described in detail below with reference to FIG. 7 to FIG. 9. It should be noted that, the wireless network access apparatus in FIG. 7 to FIG. 9 may be installed in a first terminal provided in this embodiment of the present invention, so as to apply to the method shown in FIG. 1 to FIG. 6.

Figure 7:
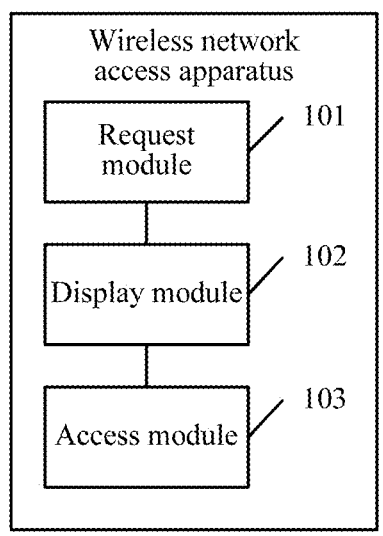
FIG. 7 illustrates a schematic structural diagram of a wireless network access apparatus according to an embodiment of the present invention.

Refer to FIG. 7, which is a schematic structural diagram of a wireless network access apparatus according to an embodiment of the present invention. The apparatus may include: a request module 101, a webpage display module 102, and an access module 103.

The request module 101 is configured to send a wireless network access request to a server, the wireless network access request carrying identification information of a first terminal and property information of a to-be-accessed wireless network, so that the server returns an image verification code according to the wireless network access request.

The identification information of the first terminal is used to uniquely identify the first terminal, which may be an IP address of the first terminal or a factory serial number of the first terminal. The property information of the wireless network includes a name and/or an address of the wireless network. The property information of the wireless network may uniquely identify the wireless network, and shall be necessary information for accessing the wireless network. It should be noted that, according to a wireless network access feature, the property information of the wireless network may further include information about whether to set a key, information about a provider of the wireless network, signal strength of the wireless network, and the like. For example, property information of a WiFi network may include a WiFi name and a WiFi IP address, and may further include information about a WiFi network provider, information about whether to set a key, and the like. The image verification code may be a two-dimensional code, which includes, but is not limited to, a QR code, a PDF417 two-dimensional code, a Datamatrix two-dimensional code, and the like.

During specific implementation, the server generates the image verification code according to the wireless network access request from the request module 101, where the image verification code includes the identification information of the first terminal and the property information of the wireless network; and further, the server returns the image verification code.

The display module 102 is configured to display the image verification code, so that a second terminal scans the image verification code to initiate wireless network access authentication to the server, and accesses the wireless network after the authentication of the server succeeds.

The second terminal may be a terminal device with a code scanning function, which includes, but is not limited to, a notebook computer, a mobile phone, a PAD, a smart wearable device, and the like. During actual application, an application with a code scanning function may be installed in the second terminal, such as an instant messaging application, an SNS application, or a browser application; and the second terminal may enable the application with the code scanning function, and scan and parse the image verification code displayed by the display module 102. Because the image verification code includes the identification information of the first terminal and the property information of the wireless network, the second terminal initiates wireless network access authentication based on a scanning result of the image verification code; the server may acquire an authentication result by authenticating whether the identification information of the first terminal and the property information of the wireless network that are submitted by the second terminal are correct, and connect the second terminal to the wireless network after the authentication succeeds.

An access module 103 is configured to access the wireless network after the authentication of the server succeeds.

The access module 103 accesses the wireless network after the authentication of the server succeeds, so that the first terminal accesses the wireless network. In this way, the first terminal and the second terminal are connected to the wireless network at the same time in one wireless network access procedure, thereby simplifying a wireless network access process.

In this embodiment of the present invention, a first terminal displays an image verification code, and a second terminal initiates a wireless network access process by scanning the image verification code, so that one or more terminals can fast and conveniently access a wireless network by collaborative operations of the first terminal and the second terminal, thereby improving wireless network access efficiency; in addition, the wireless network is accessed in a code scanning manner, without the need of manually entering information and performing search, thereby further improving the wireless network access efficiency and satisfying the fast and convenient requirements of the mobile Internet.

Figure 8:
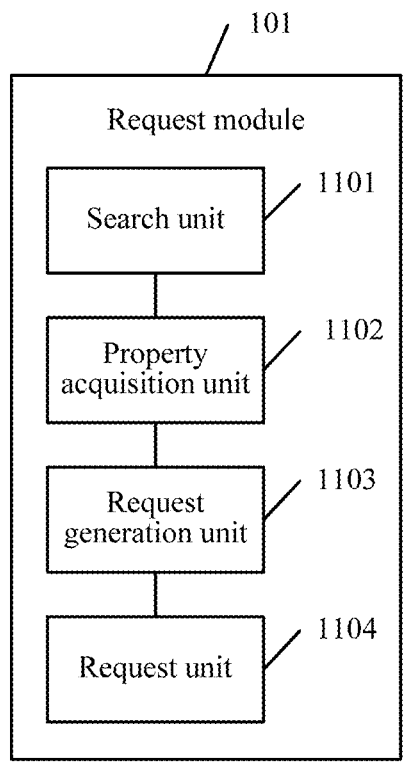
FIG. 8 illustrates a schematic structural diagram of an embodiment of a request module shown in FIG. 7.

Refer to FIG. 8, which is a schematic structural diagram of an embodiment of a request module shown in FIG. 7. The request module 101 may include: a search unit 1101, a property acquisition unit 1102, a request generation unit 1103, and a request unit 1104.

The search unit 1101 is configured to search for a list of accessible wireless networks, and select a to-be-accessed wireless network from the list of wireless networks.

The search unit 1101 may enable a wireless network access function thereof, searches for a list of accessible wireless networks, and selects a to-be-accessed wireless network. For example, when a user is in a coffee shop, a list of accessible wireless networks that can be searched for by the search unit 1101 by using a handheld PAD includes a total of three wireless networks: A, B, and C, the user intends to access the wireless network A, and then the search unit 1101 selects the wireless network A from the list of wireless networks.

The property acquisition unit 1102 is configured to acquire the property information of the wireless network.

The property information of the wireless network may uniquely identify the wireless network, and shall be necessary information for accessing the wireless network. It should be noted that, according to a wireless network access feature, the property information of the wireless network may further include information about whether to set a key, information about a provider of the wireless network, signal strength of the wireless network, and the like. According to the example in this embodiment, after selecting the wireless network A, the property acquisition unit 1102 acquires property information of the wireless network A, which may include: a name "cafe" of the wireless network A and an IP address "192.16.0.111" of the wireless network A.

The request generation unit 1103 is configured to generate the wireless network access request according to the identification information of the first terminal and the property information of the wireless network.

The request unit 1104 is configured to send the wireless network access request to the server.

In this embodiment of the present invention, a first terminal displays an image verification code, and a second terminal initiates a wireless network access process by scanning the image verification code, so that one or more terminals can fast and conveniently access a wireless network by collaborative operations of the first terminal and the second terminal, thereby improving wireless network access efficiency; in addition, the wireless network is accessed in a code scanning manner, without the need of manually entering information and performing search, thereby further improving the wireless network access efficiency and satisfying the fast and convenient requirements of the mobile Internet.

Figure 9:
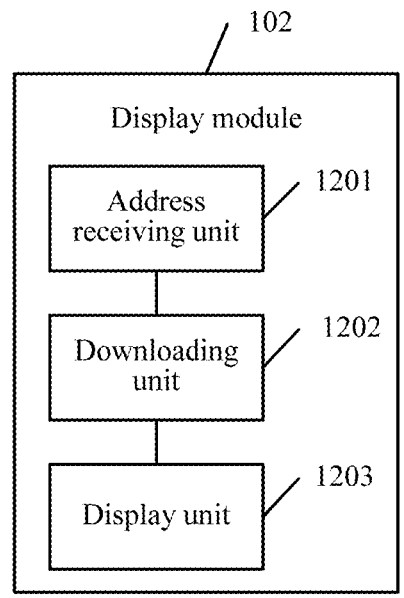
FIG. 9 illustrates a schematic structural diagram of an embodiment of a webpage display module shown in FIG. 7.

Refer to FIG. 9, which is a schematic structural diagram of an embodiment of a webpage display module shown in FIG. 7. The webpage display module 102 may include: an address receiving unit 1201, a downloading unit 1202, and a display unit 1203.

The address receiving unit 1201 is configured to receive address information of a redirection webpage that is returned by the server. The address information of the redirection webpage may be URL information.

The downloading unit 1202 is configured to download page content of the redirection webpage according to the address information of the redirection webpage, where the page content includes the image verification code.

The display unit 1203 is configured to display the image verification code in the redirection webpage.

The first terminal may include a browser, and the display unit 1203 may display the image verification code in the redirection webpage by using the browser of the first terminal. It should be noted that, the redirection webpage is characterized by that, after the browser of the first terminal is started, no matter which address information is entered to an address bar of the browser, the browser of the first terminal is always redirected to the address information of the redirection webpage, and the display unit 1203 controls the browser to display the image verification code in the redirection webpage.

In this embodiment of the present invention, a first terminal displays an image verification code, and a second terminal initiates a wireless network access process by scanning the image verification code, so that one or more terminals can fast and conveniently access a wireless network by collaborative operations of the first terminal and the second terminal, thereby improving wireless network access efficiency; in addition, the wireless network is accessed in a code scanning manner, without the need of manually entering information and performing search, thereby further improving the wireless network access efficiency and satisfying the fast and convenient requirements of the mobile Internet.

An embodiment of the present invention further discloses a terminal, the terminal may be a first terminal provided in the embodiment of the present invention, so as to apply to the wireless network access method shown in FIG. 1 to FIG. 6. The terminal may be a terminal device with a wireless network access function, which includes, but is not limited to, a notebook computer, a mobile phone, a PAD, a smart wearable device, and the like. The terminal includes a wireless network access apparatus. Reference may be made to related description in the embodiments shown in FIG. 7 to FIG. 9 for a structure and a function of the wireless network access apparatus, and the details are not provided herein again.

Another wireless network access apparatus provided by an embodiment of the present invention is described in detail below with reference to FIG. 10 to FIG. 12. It should be noted that, the wireless network access apparatus in FIG. 10 to FIG. 12 may be installed in a server provided in this embodiment of the present invention, so as to apply to the method shown in FIG. 1 to FIG. 6.

Figure 10:
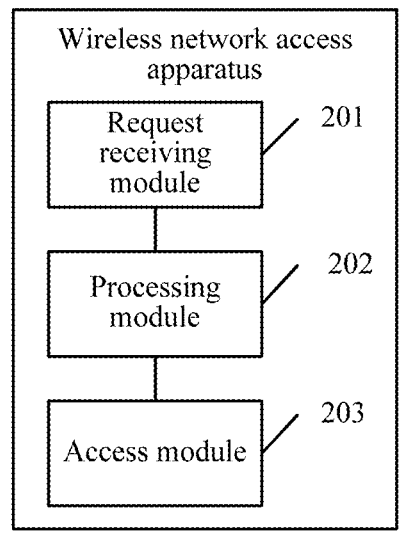
FIG. 10 illustrates a schematic structural diagram of another wireless network access apparatus according to an embodiment of the present invention.

Refer to FIG. 10, which is a schematic structural diagram of a wireless network access apparatus according to an embodiment of the present invention. The apparatus may include: a request receiving module 201, a processing module 202, and an access module 203.

The request receiving module 201 is configured to receive a wireless network access request sent by a first terminal, the wireless network access request carrying identification information of the first terminal and property information of a to-be-accessed wireless network.

The first terminal may be a terminal device with a wireless network access function, which includes, but is not limited to, a notebook computer, a mobile phone, a PAD, a smart wearable device, and the like. The identification information of the first terminal is used to uniquely identify the first terminal, which may be an IP address of the first terminal or a factory serial number of the first terminal. The property information of the wireless network includes a name and/or an address of the wireless network. The property information of the wireless network may uniquely identify the wireless network, and shall be necessary information for accessing the wireless network. It should be noted that, according to a wireless network access feature, the property information of the wireless network may further include information about whether to set a key, information about a provider of the wireless network, signal strength of the wireless network, and the like. For example, property information of a WiFi network may include a WiFi name and a WiFi IP address, and may further include information about a WiFi network provider, information about whether to set a key, and the like.

The processing module 202 is configured to generate an image verification code according to the wireless network access request, and return the image verification code to the first terminal for display, so that a second terminal scans the image verification code to return access authentication information to the server.

The image verification code may be a two-dimensional code, which includes, but is not limited to, a QR code, a PDF417 two-dimensional code, a Datamatrix two-dimensional code, and the like. The image verification code includes the identification information of the first terminal and the property information of the wireless network. The second terminal may be a terminal device with a code scanning function, which includes, but is not limited to, a notebook computer, a mobile phone, a PAD, a smart wearable device, and the like. During actual application, an application with a code scanning function may be installed in the second terminal, such as an instant messaging application, an SNS application, or a browser application; and the second terminal may enable the application with the code scanning function, and scan and parse the image verification code displayed by the first terminal, to obtain the identification information of the first terminal and the property information of the wireless network; and the second terminal generates the access authentication information according to the identification information of the first terminal and the property information of the wireless network that are obtained by code scanning, and identification information of the second terminal.

The access module 203 is configured to perform wireless network access authentication according to the access authentication information, and connect the first terminal and the second terminal to the wireless network after the authentication succeeds.

The access module 203 authenticates whether the identification information of the first terminal and the property information of the wireless network in the access authentication information are correct; it indicates that the authentication succeeds if they are correct; and it indicates that the authentication fails if they are incorrect. After the authentication succeeds, the access module 203 may connect the first terminal to the wireless network according to the identification information of the first terminal; and the access module 203 may further connect the second terminal to the wireless network according to the identification information of the second terminal, so that the first terminal and the second terminal are connected to the wireless network at the same time in one wireless network access procedure, thereby simplifying a wireless network access process.

In this embodiment of the present invention, a first terminal displays an image verification code, and a second terminal initiates a wireless network access process by scanning the image verification code, so that one or more terminals can fast and conveniently access a wireless network by collaborative operations of the first terminal and the second terminal, thereby improving wireless network access efficiency; in addition, the wireless network is accessed in a code scanning manner, without the need of manually entering information and performing search, thereby further improving the wireless network access efficiency and satisfying the fast and convenient requirements of the mobile Internet.

Figure 11:
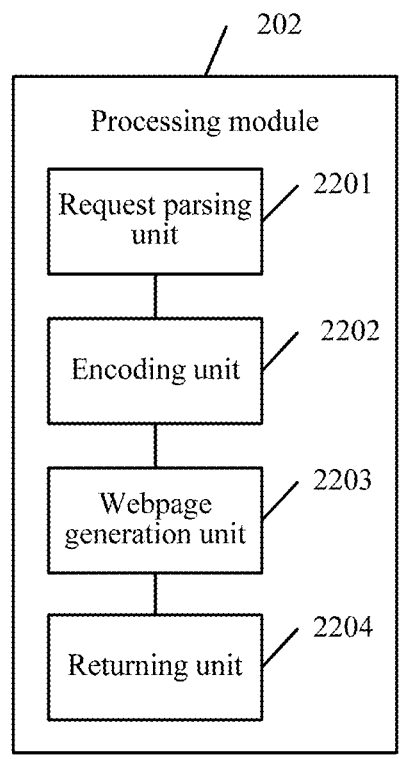
FIG. 11 illustrates a schematic structural diagram of an embodiment of a processing module shown in FIG. 10.

Refer to FIG. 11, which is a schematic structural diagram of an embodiment of a processing module shown in FIG. 10. The processing module 202 may include: a request parsing unit 2201, an encoding unit 2202, a webpage generation unit 2203, and a returning unit 2204.

The request parsing unit 2201 is configured to parse the wireless network access request, to obtain the identification information of the first terminal and the property information of the wireless network.

The encoding unit 2202 is configured to encode the identification information of the first terminal and the property information of the wireless network by using a preset image encoding rule, to generate the image verification code.

The preset image encoding rule may be a two-dimensional code encoding rule; and the image verification code may be a two-dimensional code, which includes, but is not limited to, a QR code, a PDF417 two-dimensional code, a Datamatrix two-dimensional code, and the like.

The webpage generation unit 2203 is configured to use the image verification code as page content, and generate a redirection webpage including the image verification code.

It should be noted that, the redirection webpage may further include other content in addition to this page content, that is, the image verification code, for example, may further include pictures and text related to the provider of the wireless network, or some advertisement content.

The returning unit 2204 is configured to return address information of the redirection webpage to the first terminal. The address information of the redirection webpage may be URL information.

In this embodiment of the present invention, a first terminal displays an image verification code, and a second terminal initiates a wireless network access process by scanning the image verification code, so that one or more terminals can fast and conveniently access a wireless network by collaborative operations of the first terminal and the second terminal, thereby improving wireless network access efficiency; in addition, the wireless network is accessed in a code scanning manner, without the need of manually entering information and performing search, thereby further improving the wireless network access efficiency and satisfying the fast and convenient requirements of the mobile Internet.

Figure 12:
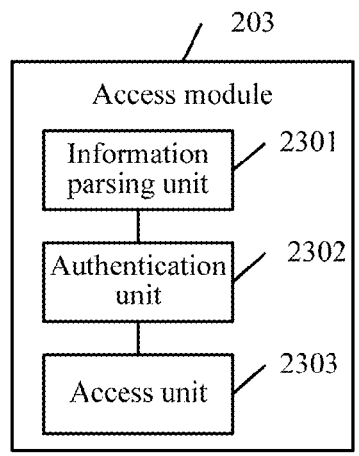
FIG. 12 illustrates a schematic structural diagram of an embodiment of an access module shown in FIG. 10.

Refer to FIG. 12, which is a schematic structural diagram of an embodiment of an access module shown in FIG. 10. The access module 203 may include an information parsing unit 2301, an authentication unit 2302, and an access unit 2303.

The information parsing unit 2301 is configured to parse the access authentication information, to obtain the identification information of the first terminal, the property information of the wireless network, and the identification information of the second terminal.

The authentication unit 2302 is configured to authenticate whether the identification information of the first terminal and the property information of the wireless network in the access authentication information are correct, where it indicates that the authentication succeeds if they are correct.

The access unit 2303 is configured to: after the authentication succeeds, connect the first terminal to the wireless network according to the identification information of the first terminal, and connect the second terminal to the wireless network according to the identification information of the second terminal.

In this embodiment of the present invention, a first terminal displays an image verification code, and a second terminal initiates a wireless network access process by scanning the image verification code, so that one or more terminals can fast and conveniently access a wireless network by collaborative operations of the first terminal and the second terminal, thereby improving wireless network access efficiency; in addition, the wireless network is accessed in a code scanning manner, without the need of manually entering information and performing search, thereby further improving the wireless network access efficiency and satisfying the fast and convenient requirements of the mobile Internet.

An embodiment of the present invention further discloses a server, and the server may apply to the wireless network access method shown in FIG. 1 to FIG. 6. The server includes a wireless network access apparatus. Reference may be made to related description in the embodiments shown in FIG. 10 to FIG. 12 for a structure and a function of the wireless network access apparatus, and the details are not provided herein again.

Still another wireless network access apparatus provided by an embodiment of the present invention is described in detail below with reference to FIG. 13 to FIG. 14. It should be noted that, the wireless network access apparatus in FIG. 13 to FIG. 14 may be installed in a second terminal provided in this embodiment of the present invention, so as to apply to the method shown in FIG. 1 to FIG. 6.

Figure 13:
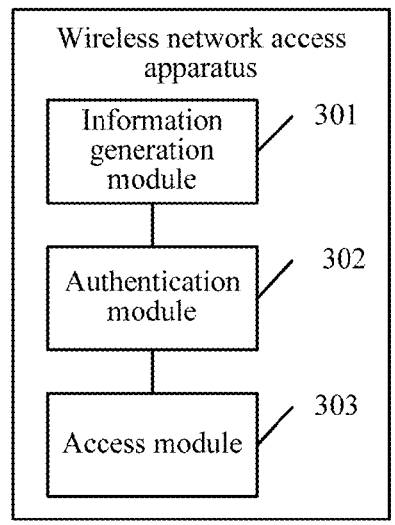
FIG. 13 illustrates a schematic structural diagram of still another wireless network access apparatus according to an embodiment of the present invention.

Refer to FIG. 13, which is a schematic structural diagram of a wireless network access apparatus according to an embodiment of the present invention. The apparatus may include: an information generation module 301, an authentication module 302, and an access module 303.

The information generation module 301 is configured to scan an image verification code displayed by a first terminal, and generate access authentication information, the image verification code including identification information of the first terminal and property information of a to-be-accessed wireless network.

The information generation module 301 may scan and parse, by using a code scanning function of a second terminal, the image verification code displayed by the first terminal, to obtain the identification information of the first terminal and the property information of the wireless network. The information generation module 301 generates the access authentication information according to the identification information of the first terminal and the property information of the wireless network that are obtained by code scanning, and identification information of the second terminal.

The authentication module 302 is configured to send the access authentication information to a server, so that the server performs wireless network access authentication according to the access authentication information, and connects the first terminal to the wireless network after the authentication succeeds.

The server authenticates whether the identification information of the first terminal and the property information of the wireless network in the access authentication information sent by the authentication module 302 are correct; it indicates that the authentication succeeds if they are correct; and it indicates that the authentication fails if they are incorrect. After the authentication succeeds, the server may connect the first terminal to the wireless network according to the identification information of the first terminal.

The access module 303 is configured to access the wireless network after the authentication of the server succeeds.

The access module 303 accesses the wireless network after the authentication of the server succeeds, so that the second terminal accesses the wireless network. In this way, the first terminal and the second terminal are connected to the wireless network at the same time in one wireless network access procedure, thereby simplifying a wireless network access process.

In this embodiment of the present invention, a first terminal displays an image verification code, and a second terminal initiates a wireless network access process by scanning the image verification code, so that one or more terminals can fast and conveniently access a wireless network by collaborative operations of the first terminal and the second terminal, thereby improving wireless network access efficiency; in addition, the wireless network is accessed in a code scanning manner, without the need of manually entering information and performing search, thereby further improving the wireless network access efficiency and satisfying the fast and convenient requirements of the mobile Internet.

Figure 14:
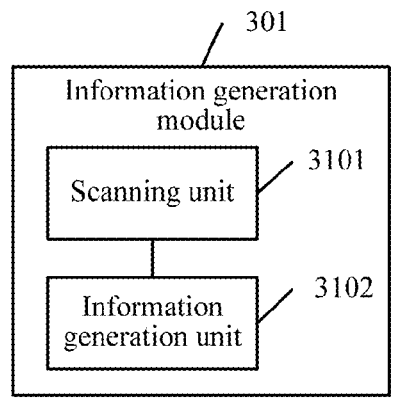
FIG. 14 illustrates a schematic structural diagram of an embodiment of an information generation module shown in FIG. 13.

Refer to FIG. 14, which is schematic structural diagram of an embodiment of an information generation module shown in FIG. 13. The information generation module 301 may include a scanning unit 3101 and an information generation unit 3102.

The scanning unit 3101 is configured to scan the image verification code, displayed by the first terminal, in a redirection webpage, to obtain the identification information of the first terminal and the property information of the wireless network.

The scanning unit 3101 may scan and parse the image verification code, displayed by the first terminal, in the redirection webpage by using a code scanning function of the second terminal, to obtain the identification information of the first terminal and the property information of the wireless network.

The information generation unit 3102 is configured to generate the access authentication information according to the identification information of the first terminal, the property information of the wireless network, and identification information of the second terminal.

In this embodiment of the present invention, a first terminal displays an image verification code, and a second terminal initiates a wireless network access process by scanning the image verification code, so that one or more terminals can fast and conveniently access a wireless network by collaborative operations of the first terminal and the second terminal, thereby improving wireless network access efficiency; in addition, the wireless network is accessed in a code scanning manner, without the need of manually entering information and performing search, thereby further improving the wireless network access efficiency and satisfying the fast and convenient requirements of the mobile Internet.

An embodiment of the present invention further discloses a terminal, the terminal may be a second terminal provided in the embodiment of the present invention, so as to apply to the wireless network access method shown in FIG. 1 to FIG. 6. The terminal may be a terminal device with a code scanning function, which includes, but is not limited to, a notebook computer, a mobile phone, a PAD, a smart wearable device, and the like. During actual application, an application with a code scanning function may be installed in the terminal, such as an instant messaging application, an SNS application, or a browser application. The terminal includes a wireless network access apparatus. Reference may be made to related description in the embodiments shown in FIG. 13 to FIG. 14 for a structure and a function of the wireless network access apparatus, and the details are not provided herein again.

Figure 15:
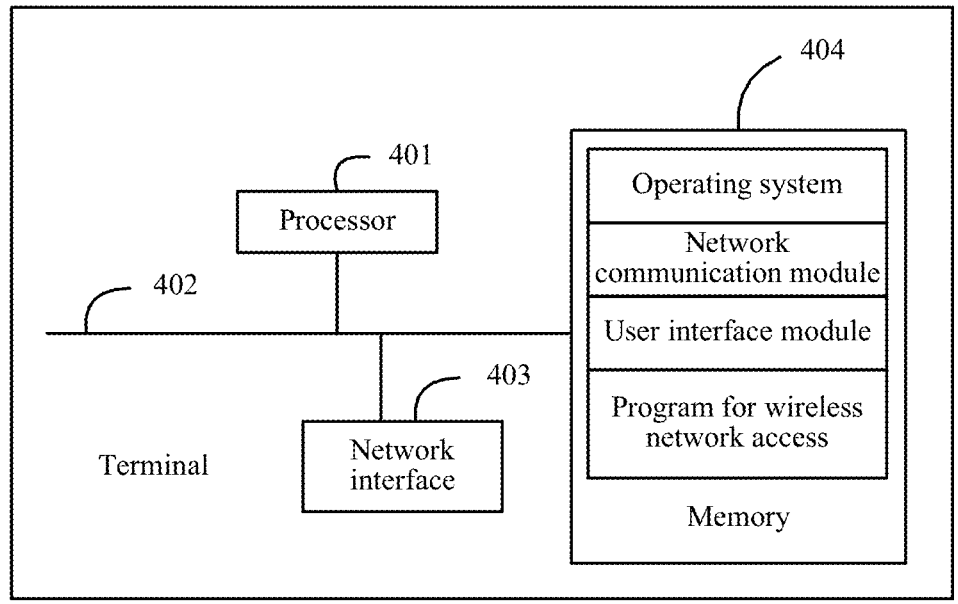
FIG. 15 illustrates a schematic structural diagram of a terminal according to an embodiment of the present invention.

Refer to FIG. 15, which is a schematic structural diagram of a terminal according to an embodiment of the present invention. The first terminal, the second terminal, and/or various disclosed modules/units may be implemented by the terminal illustrated in FIG. 15. The terminal according to this embodiment of the present invention includes: at least one processor 401, for example, a CPU; at least one communication bus 402; at least one network interface 403, and a memory 404. The communication bus 402 is configured to implement connection and communication between these components. The network interface 403 may optionally include a standard wired interface and a standard wireless interface (such as a WiFi interface, or a mobile communication interface). The memory 404 may be a high-speed RAM memory, or may also be a non-volatile memory, such as at least one magnetic disk memory. The memory 404 optionally may also be at least one storage device far away from the processor 401. As shown in FIG. 15, the memory 404 serving as a computer storage medium stores an operating system and a network communication module; and stores a program for wireless network access and other programs.

In a feasible implementation manner, specifically, the processor 401 of the first terminal may be configured to invoke the program for wireless network access that is stored in the memory 404 of the first terminal, to execute the following steps: sending a wireless network access request to a server through the network interface 403 of the first terminal, the wireless network access request carrying identification information of a first terminal and property information of a to-be-accessed wireless network, so that the server returns an image verification code according to the wireless network access request; displaying the image verification code on a display screen of the first terminal, so that a second terminal scans the image verification code to initiate wireless network access authentication to the server, and accesses the wireless network after the authentication of the server succeeds; and accessing the wireless network after the authentication of the server succeeds.

Further, the processor 401 of the first terminal may perform the following steps when executing the step of sending a wireless network access request to a server: searching for a list of accessible wireless networks, and selecting a to-be-accessed wireless network from the list of wireless networks; acquiring the property information of the wireless network; generating the wireless network access request according to the identification information of the first terminal and the property information of the wireless network; and sending the wireless network access request to the server.

Further, the processor 401 of the first terminal may perform the following steps when executing the step of displaying the image verification code: receiving address information of a redirection webpage that is returned by the server; downloading page content of the redirection webpage according to the address information of the redirection webpage, where the page content includes the image verification code; and displaying the image verification code in the redirection webpage.

In another feasible implementation manner, specifically, the processor 401 of the second terminal may be configured to invoke the program for wireless network access that is stored in the memory 404 of the second terminal, to execute the following steps: scanning an image verification code displayed by a first terminal (e.g., through a camera of the second terminal), and generating access authentication information, the image verification code including identification information of the first terminal and the property information of a to-be-accessed wireless network; sending the access authentication information to a server (e.g., through the network interface 403 of the second terminal), so that the server performs wireless network access authentication according to the access authentication information, and connects the first terminal to the wireless network after the authentication succeeds; and accessing the wireless network after the authentication of the server succeeds.

Further, the processor 401 of the second terminal may perform the following steps when executing the step of scanning an image verification code displayed by a first terminal, and generating access authentication information: scanning the image verification code, displayed by the first terminal, in a redirection webpage, to obtain the identification information of the first terminal and the property information of the wireless network; and generating the access authentication information according to the identification information of the first terminal, the property information of the wireless network, and identification information of the second terminal, and sending the access authentication information to the server.

The image verification code includes a two-dimensional code; the property information of the wireless network includes a name and/or an address of the wireless network.

In this embodiment of the present invention, a first terminal displays an image verification code, and a second terminal initiates a wireless network access process by scanning the image verification code, so that one or more terminals can fast and conveniently access a wireless network by collaborative operations of the first terminal and the second terminal, thereby improving wireless network access efficiency; in addition, the wireless network is accessed in a code scanning manner, without the need of manually entering information and performing search, thereby further improving the wireless network access efficiency and satisfying the fast and convenient requirements of the mobile Internet.

Figure 16:
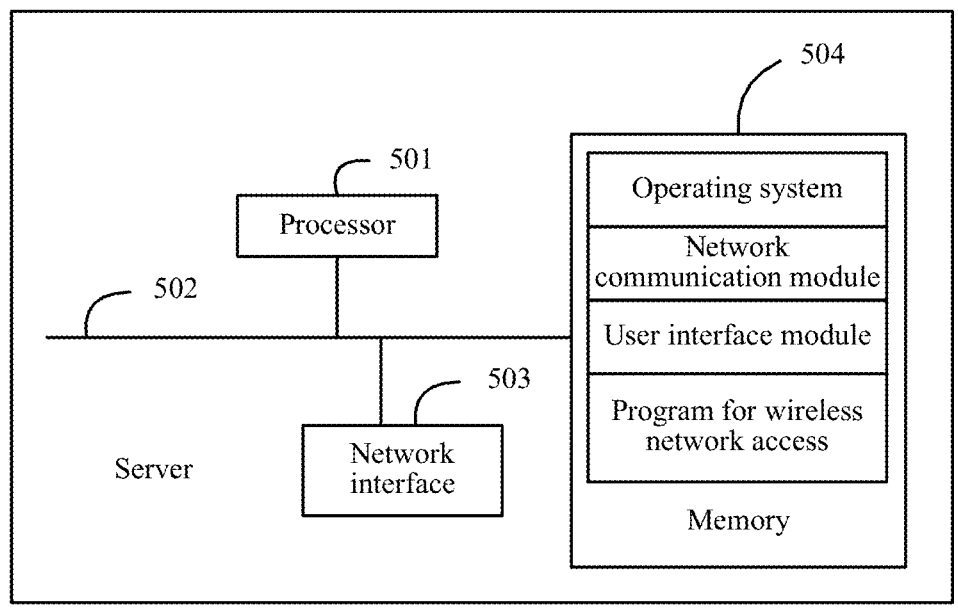
FIG. 16 illustrates a schematic structural diagram of a server according to an embodiment of the present invention.

Refer to FIG. 16, which is a schematic structural diagram of a server according to an embodiment of the present invention. The server according to this embodiment of the present invention includes: at least one processor 501, for example, a CPU; at least one communication bus 502; at least one network interface 503, and a memory 504. The communication bus 502 is configured to implement connection and communication between these components. The network interface 503 may optionally include a standard wired interface and a standard wireless interface (such as a WiFi interface, or a mobile communication interface). The memory 504 may be a high-speed RAM memory, or may also be a non-volatile memory, such as at least one magnetic disk memory. The memory 504 optionally may also be at least one storage device far away from the processor 501. As shown in FIG. 16, the memory 504 serving as a computer storage medium stores an operating system and a network communication module; and stores a program for wireless network access and other programs. For example, the wireless access device of the server may utilize the WiFi interface in the network interface 503 and program for wireless network access in the storage medium 504 the for connecting to the first terminal and the second terminal. The authentication device of the server may utilize the network interface 503 and the operating system in the storage medium 504 for generating the image verification code, generating the redirection webpage, and performing wireless network access authentication.

Specifically, the processor 501 may be configured to invoke the program for wireless network access that is stored in the memory 504, to execute the following steps: receiving a wireless network access request sent by a first terminal, the wireless network access request carrying identification information of a first terminal and property information of a to-be-accessed wireless network; generating an image verification code according to the wireless network access request, and returning the image verification code to the first terminal for display, so that a second terminal scans the image verification code to return access authentication information to the server; and performing wireless network access authentication according to the access authentication information, and connecting the first terminal and the second terminal to the wireless network after the authentication succeeds.

Further, the processor 501 specifically executes the following steps when executing the step of generating an image verification code according to the wireless network access request: parsing the wireless network access request, to obtain the identification information of the first terminal and the property information of the wireless network; encoding the identification information of the first terminal and the property information of the wireless network by using a preset image encoding rule, to generate the image verification code; using the image verification code as page content, and generating a redirection webpage including the image verification code; and returning address information of the redirection webpage to the first terminal.

Further, the processor 501 specifically executes the followings steps when executing the step of performing wireless network access authentication according to the access authentication information, and connecting the first terminal and the second terminal to the wireless network after the authentication succeeds: parsing the access authentication information, to obtain the identification information of the first terminal, the property information of the wireless network, and identification information of the second terminal; authenticating whether the identification information of the first terminal and the property information of the wireless network in the access authentication information are correct, where it indicates that the authentication succeeds if they are correct; and after the authentication succeeds, connecting the first terminal to the wireless network according to the identification information of the first terminal, and connecting the second terminal to the wireless network according to the identification information of the second terminal.

The image verification code includes a two-dimensional code; the property information of the wireless network includes a name and/or an address of the wireless network.

In this embodiment of the present invention, a first terminal displays an image verification code, and a second terminal initiates a wireless network access process by scanning the image verification code, so that one or more terminals can fast and conveniently access a wireless network by collaborative operations of the first terminal and the second terminal, thereby improving wireless network access efficiency; in addition, the wireless network is accessed in a code scanning manner, without the need of manually entering information and performing search, thereby further improving the wireless network access efficiency and satisfying the fast and convenient requirements of the mobile Internet.

A person of ordinary skill in the art may understand that all or some of the steps of the foregoing embodiments may be implemented by a computer program instructing relevant hardware. The program may be stored in a computer readable storage medium. When the program is run, the steps of the method according to the embodiments of the present invention are performed. The storage medium may be a magnetic disk, an optical disc, a Read-Only Memory (ROM), a Random Access Memory (RAM), or the like.

The above descriptions are merely preferred embodiments of the present disclosure, but are not intended to limit the present disclosure. Any equivalent modification made according to the claims of the present disclosure should fall within the scope of the present disclosure.

What is claimed is:

1. A wireless network access method, comprising:
   sending, by a first terminal, a wireless network access request to a server, the wireless network access request carrying identification information of the first terminal and property information of a to-be-accessed wireless network;
   generating, by the server according to the wireless network access request, an image verification code and returning the image verification code to the first terminal for display;
   scanning, by a second terminal, the image verification code displayed by the first terminal, generating access authentication information, and sending the access authentication information to the server; and
   performing, by the server, wireless network access authentication according to the access authentication information, and connecting the first terminal and the second terminal to the to-be-accessed wireless network after the authentication succeeds.

2. The method according to claim 1, before sending, by a first terminal, a wireless network access request to a server, the method comprising:
   searching, by the first terminal, for a list of accessible wireless networks, and selecting the to-be-accessed wireless network from the list of accessible wireless networks.

3. The method according to claim 2, further comprising:
   acquiring, by the first terminal, the property information of the to-be-accessed wireless network; and
   generating, by the first terminal, the wireless network access request according to the identification information of the first terminal and the property information of the to-be-accessed wireless network.

4. The method according to claim 1, wherein the generating, by the server according to the wireless network access request, an image verification code and returning the image verification code to the first terminal comprises:
   parsing, by the server, the wireless network access request, and obtaining the identification information of the first terminal and the property information of the to-be-accessed wireless network; and
   encoding, by the server, the identification information of the first terminal and the property information of the wireless network by using a preset image encoding rule, to generate the image verification code.

5. The method according to claim 3, wherein the generating, by the server according to the wireless network access request, an image verification code and returning the image verification code to the first terminal, comprising:
   using, by the server, the image verification code as page content, and generating a redirection webpage comprising the image verification code; and
   returning, by the server, address information of the redirection webpage to the first terminal.

6. The method according to claim 5, wherein the displaying, by the first terminal, the image verification code comprises:
receiving, by the first terminal, the address information of the redirection webpage that is returned by the server;
downloading, by the first terminal, page content of the redirection webpage according to the address information of the redirection webpage, wherein the page content comprises the image verification code; and
displaying, by the first terminal, the image verification code in the redirection webpage.

7. The method according to claim 6, wherein the scanning, by a second terminal, the image verification code displayed by the first terminal, generating access authentication information, and sending the access authentication information to the server comprises:
scanning, by the second terminal, the image verification code, displayed by the first terminal, in the redirection webpage, to obtain the identification information of the first terminal and the property information of the to-be-accessed wireless network; and
generating, by the second terminal, the access authentication information according to the identification information of the first terminal, the property information of the to-be-accessed wireless network, and identification information of the second terminal, and sending the access authentication information to the server.

8. The method according to claim 7, wherein the performing, by the server, wireless network access authentication according to the access authentication information, and connecting the first terminal and the second terminal to the to-be-accessed wireless network after the authentication succeeds comprises:
parsing, by the server, the access authentication information, to obtain the identification information of the first terminal, the property information of the to-be-accessed wireless network, and the identification information of the second terminal;
authenticating, by the server, whether the identification information of the first terminal and the property information of the to-be-accessed wireless network in the access authentication information are correct, wherein the server determines that the authentication succeeds if the identification information of the first terminal and the property information of the to-be-accessed wireless network in the access authentication information are correct; and
after the authentication succeeds, connecting, by the server, the first terminal to the to-be-accessed wireless network according to the identification information of the first terminal, and connecting the second terminal to the to-be-accessed wireless network according to the identification information of the second terminal.

9. The method according to claim 1, wherein the image verification code comprises a two-dimensional code, and the property information of the to-be-accessed wireless network comprises at least one of a name and an address of the wireless network.

10. A wireless network access method, comprising:
sending, by a first terminal, a wireless network access request to a server, the wireless network access request carrying identification information of the first terminal and property information of a to-be-accessed wireless network, so that the server returns an image verification code according to the wireless network access request;
displaying, by the first terminal, the image verification code, so that a second terminal scans the image verification code to initiate wireless network access authentication to the server, and accesses the to-be-accessed wireless network after the authentication of the server succeeds; and
accessing, by the first terminal, the to-be-accessed wireless network after the authentication of the server succeeds.

11. A wireless network access method, comprising:
receiving, by a server, a wireless network access request sent by a first terminal, the wireless network access request carrying identification information of the first terminal and property information of a to-be-accessed wireless network;
generating, by the server, an image verification code according to the wireless network access request, and returning the image verification code to the first terminal for display, so that a second terminal scans the image verification code to return access authentication information to the server; and
performing, by the server, wireless network access authentication according to the access authentication information, and connecting the first terminal and the second terminal to the to-be-accessed wireless network after the authentication succeeds.

12. A wireless network access method, comprising:
scanning, by a second terminal, an image verification code displayed by a first terminal, and generating access authentication information, the image verification code comprising identification information of the first terminal and property information of a to-be-accessed wireless network;
sending, by the second terminal, the access authentication information to a server, so that the server performs wireless network access authentication according to the access authentication information, and connects the first terminal to the to-be-accessed wireless network after the authentication succeeds; and
accessing, by the second terminal, the to-be-accessed wireless network after the authentication of the server succeeds.

13. A terminal, comprising a plurality of program modules comprising computer-implemented instructions stored in memory of a computing device and executed by one or more processors of the terminal, the plurality program modules comprising: a wireless network access apparatus,
the wireless network access apparatus comprising:
a request module, configured to send a wireless network access request to a server, the wireless network access request carrying identification information of a first terminal and property information of a to-be-accessed wireless network, so that the server returns an image verification code according to the wireless network access request;
a display module, configured to display the image verification code, so that a second terminal scans the image verification code to initiate wireless network access authentication to the server, and accesses the to-be-accessed wireless network after the authentication of the server succeeds; and
an access module, configured to access the to-be-accessed wireless network after the authentication of the server succeeds.

14. The apparatus according to claim 13, wherein the request module comprises:

a search unit, configured to search for a list of accessible wireless networks, and select the to-be-accessed wireless network from the list of accessible wireless networks; and a property acquisition unit, configured to acquire the property information of the wireless network.

15. The apparatus according to claim 14, wherein the request module comprises:

a request generation unit, configured to generate the wireless network access request according to the identification information of the first terminal and the property information of the to-be-accessed wireless network; and a request unit, configured to send the wireless network access request to the server.

16. The apparatus according to claim 15, wherein the display module comprises:

an address receiving unit, configured to receive address information of a redirection webpage that is returned by the server;

a downloading unit, configured to download page content of the redirection webpage according to the address information of the redirection webpage, wherein the page content comprises the image verification code; and a display unit, configured to display the image verification code in the redirection webpage.

17. A terminal, comprising a plurality of program modules comprising computer-implemented instructions stored in memory of a computing device and executed by one or more processors of the terminal, the plurality program modules comprising: a wireless network access apparatus, the wireless network access apparatus comprising:

an information generation module, configured to scan an image verification code displayed by a first terminal, and generate access authentication information, the image verification code comprising identification information of the first terminal and property information of a to-be-accessed wireless network;

an authentication module, configured to send the access authentication information to a server, so that the server performs wireless network access authentication according to the access authentication information, and connects the first terminal to the to-be-accessed wireless network after the authentication succeeds; and an access module, configured to access the to-be-accessed wireless network after the authentication of the server succeeds.

18. The terminal according to claim 17, wherein the information generation module comprises:

a scanning unit, configured to scan the image verification code, displayed by the first terminal, in a redirection webpage, to obtain the identification information of the first terminal and the property information of the to-be-accessed wireless network; and an information generation unit, configured to generate the access authentication information according to the identification information of the first terminal, the property information of the wireless network, and identification information of a second terminal.

* * * * *